US009001845B2

(12) United States Patent
Enescu et al.

(10) Patent No.: US 9,001,845 B2
(45) Date of Patent: Apr. 7, 2015

(54) APPARATUS AND METHOD FOR COMMUNICATION

(71) Applicant: Broadcom Corporation, Irvine, CA (US)

(72) Inventors: Mihai Enescu, Espoo (FI); Tommi Koivisto, Espoo (FI)

(73) Assignee: Broadcom Corporation, Irvine, CA (US)

( * ) Notice: Subject to any disclaimer, the term of this patent is extended or adjusted under 35 U.S.C. 154(b) by 74 days.

(21) Appl. No.: 13/779,336

(22) Filed: Feb. 27, 2013

(65) Prior Publication Data

US 2013/0223255 A1    Aug. 29, 2013

(30) Foreign Application Priority Data

Feb. 27, 2012    (GB) .................................. 1203362.7

(51) Int. Cl.
*H04W 24/10* (2009.01)
*H04L 1/00* (2006.01)

(52) U.S. Cl.
CPC ............. *H04W 24/10* (2013.01); *H04L 1/0026* (2013.01); *H04L 1/0029* (2013.01); *H04L 1/003* (2013.01)

(58) Field of Classification Search
USPC .................. 370/241, 252, 431, 463–465, 468
See application file for complete search history.

(56) References Cited

U.S. PATENT DOCUMENTS

| 5,638,125 | A | * | 6/1997 | Jeong et al. ............. 375/240.03 |
| 6,529,730 | B1 | * | 3/2003 | Komaili et al. ............ 455/452.2 |
| 8,150,187 | B1 | * | 4/2012 | Winger et al. ................ 382/251 |
| 2009/0147865 | A1 | * | 6/2009 | Zhang et al. .................. 375/259 |
| 2010/0007543 | A1 | * | 1/2010 | Mueck .......................... 341/200 |
| 2010/0322102 | A1 | * | 12/2010 | Zhou et al. .................... 370/252 |
| 2011/0039535 | A1 | | 2/2011 | Baker et al. |
| 2011/0165846 | A1 | | 7/2011 | Zheng et al. |

OTHER PUBLICATIONS

UKIPO Search Report under Section 17 compiled Jun. 20, 2012 which was issued in a related British Application No. GB1203362.7 (1 page).
L. Tang et al; Adaptive Modulation Based on Finite-Rate Feedback in Broadcast Channels; IEEE vol. 7, No. 11, Nov. 2008; pp. 4449-4454.

* cited by examiner

*Primary Examiner* — Kerri Rose
(74) *Attorney, Agent, or Firm* — Foley & Lardner LLP; Christopher J. McKenna; Daniel E. Rose

(57) ABSTRACT

An apparatus and method for communication are provided. The solution includes controlling the estimation of a radio channel to obtain an estimate of a channel quality, performing quantization of the estimate of the channel quality to obtain a channel quality index, the quantization steps being of non-uniform size and selected on the basis of the accuracy of the estimation on different levels of channel quality, and controlling the transmission of the channel quality index to the communication system.

23 Claims, 4 Drawing Sheets

APPARATUS AND METHOD FOR COMMUNICATION

CROSS REFERENCE TO RELATED APPLICATION

This application claims the benefit under 35 U.S.C. §119 (a) and 37 CFR §1.55 to UK Patent Application No. 1203362.7 filed on Feb. 27, 2012, the entire content of which is incorporated herein by reference.

TECHNICAL FIELD

The exemplary and non-limiting embodiments of the invention relate generally to wireless communication networks. Embodiments of the invention relate especially to an apparatus and a method in communication networks,

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Modern communication systems may support the use of more than one modulation method. Example of modulation methods used in communication systems include Quadrature Phase Shift Keying (QPSK), 16 Quadrature Amplitude Modulation (16 QAM) and 64 QAM to name a few. Continuous developments in research have brought up the possibility of using more and more complex modulation methods which offer greater data rates, for example.

In general, the network side of communication systems instruct the mobile units of the system to use a specific modulation and coding scheme MCS. To be able to select the best suitable MSC for each mobile unit the system may request the mobile units to perform measurements of available radio channels and report the results in some convenient way. As new modulation methods are introduced the signaling related to the new methods should be realized with minimum changes to present solutions.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus in a communication system, including at least one processor; and at least one memory including computer program code, the at least one memory and the computer program code configured to, with the at least one processor, cause the apparatus at least to perform: controlling the estimation of a radio channel to obtain an estimate of a channel quality; performing quantization of the estimate of the channel quality to obtain a channel quality index, the quantization steps being of non-uniform size and selected on the basis of the accuracy of the estimation on different levels of channel quality; controlling the transmission of the Channel quality index to the communication system.

According to an aspect of the present invention, there is provided an apparatus in a communication system, including at least one processor; and at least one memory including computer program code, the at least one memory and the computer program code configured to, with the at least one processor, cause the apparatus at least to perform: controlling the reception of a channel quality index transmitted by a transceiver of the communication system, the index describing radio channel quality; and storing a channel quality index table where different indices correspond to different channel quality values and where the quantization steps dividing quality values to different indices are of non-uniform size and selected on the basis of the accuracy of the estimation on different levels of channel quality.

According to another aspect of the present invention, there is provided a method in a communication system, including: controlling the estimation of a radio channel to obtain an estimate of a channel quality; performing quantization of the estimate of the channel quality to obtain a channel quality index, the quantization steps being of non-uniform size and selected on the basis of the accuracy of the estimation on different levels of channel quality; controlling the transmission of the channel quality index to the communication system.

According to another aspect of the present invention, there is provided a method in a communication system, including: controlling the reception of a channel quality index transmitted by a transceiver of the communication system, the index describing radio channel quality; and storing a channel quality index table where different indices correspond to different channel quality values and where the quantization steps dividing quality values to different indices are of non-uniform size and selected on the basis of the accuracy of the estimation on different levels of channel quality.

BRIEF DESCRIPTION OF DRAWINGS

Embodiments of the present invention are described below, by way of example only, with reference to the accompanying drawings, in which.

DETAILED DESCRIPTION

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Figure 1:
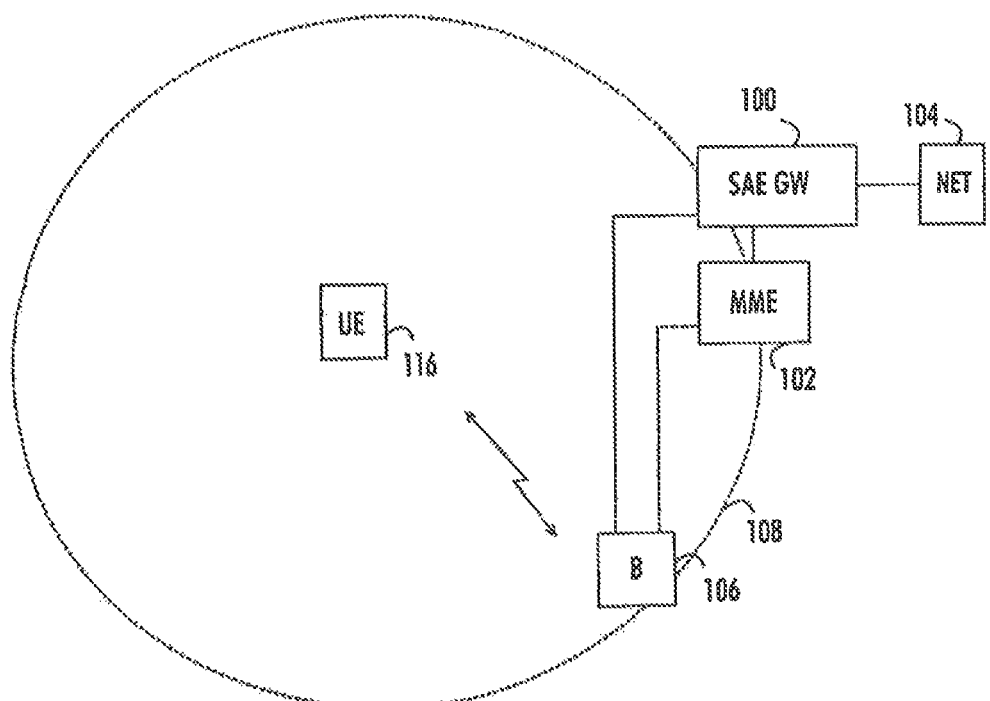
FIG. 1 illustrates an example of a communication environment.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11standard, worldwide interoperability for microwave access (WiMAX), Bluetooth®, personal communications services (PCS) and systems using ultra-wideband (MB) technology, IEEE refers to the Institute of Electrical and Electronics Engineers. LTE and LTE-A are developed by the Third Generation Partnership Project 3GPP, FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also include other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other corresponding radio systems.

The simplified example of a network of FIG. 1 includes a SAE Gateway 100 and an MME 102. The SAE Gateway 100 provides a connection to Internet 104. FIG. 1 shows an eNodeB 106 serving a cell 108. In this example, the eNodeB 106 is connected to the SAE Gateway 100 and the MME 102.

In the example of FIG. 1, user equipment UE 116 is camped on the eNodeB 106.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

User equipment UE refers to a portable computing device. Such computing devices include wireless mobile communication devices operating with or without a subscriber identification module (SIM), including, but not limited to, the following types of devices: mobile phone, smartphone, personal digital assistant (PDA), tablet computer, laptop computer.

In many communication systems, more than one modulation method is supported. In current LTE based systems, Quadrature Phase Shift Keying (QPSK), 16 Quadrature Amplitude Modulation (16 QAM) and 64 QAM are supported, in both uplink and downlink. These modulation methods enable spectrally efficient transmission in cases where Signal to Interference and Noise ratio (SINR) is unlikely to be very high, However, denser networks and decreasing cell sizes imply that in future deployments some UEs may be often in very high SINR conditions. At the same time the transceiver radio frequency (RF) and baseband technologies are developing to decrease the SINR limitations from transceiver perspective. In such case the current modulations may in fact start limiting the achievable performance especially in downlink.

Figure 2:
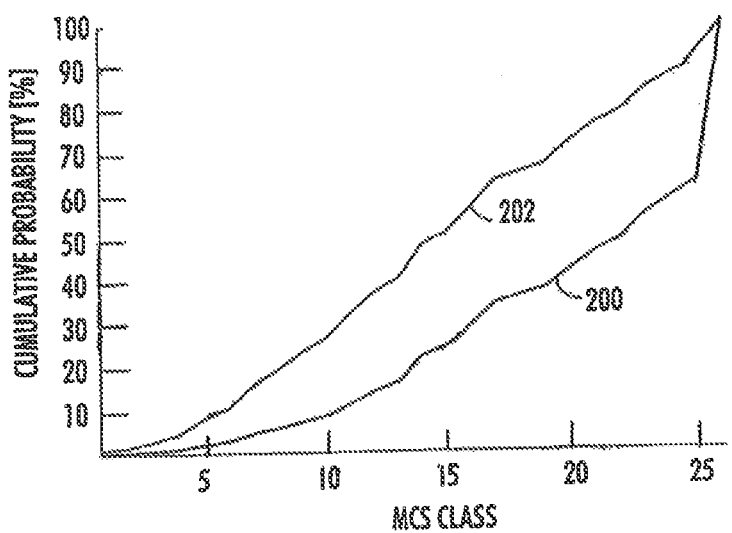
FIG. 2 illustrates the Modulation Coding Scheme (MCS) limitations faced in a pico cell.

As the UE density is increasing, demanding higher network capacity, offloading techniques are a priority on every operator's agenda. One studied scenario in LTE Release 11 is offloading to a pico cell on an adjacent frequency carrier with the macro cell, hence in easier interference conditions. FIG. 2 illustrates the Modulation Coding Scheme (MCS) limitations faced in the pico cell on adjacent frequency. The figure shows the cumulative probability of UE being in a given MCS class for pico cell 200 and macro cell 202. It can be seen that roughly 40% of the UEs connected to in this pico cell are utilizing the highest MCS class. This is an obvious limiting factor in terms of overall system performance, and it becomes desirable to consider introducing higher-order modulations to overcome the MC limitations. In case of LTE this would mean introducing 256 QAM modulation.

On IEEE side, IEEE 802.11ac is already being developed and will be extending the modulation support towards 256 QAM over 64 QAM supported by 802.11n. Thus, it is likely that 256 QAM may be introduced also into LTE downlink in future releases of the specifications.

In LTE, introducing higher-order modulations would mean changes to some aspects of the LTE specifications. For example, when UE reports channel quality indication (CQI) the CQI report should also include states for indicating that 256 QAM can be sustained, along with a suitable coding rate.

In LTE, UEs may be requested by the eNodeB to measure the quality of radio channels and report the measurement results back to the eNodeB. The reporting is realized using a Channel Quality Index CQI which points to a COL mapping table known to both the UE and the eNodeB.

Changing the CQI reports is a problematic issue, Currently LTE supports both periodic PUCCH-based CQI reports and aperiodic PUSCH-based CQI reports. PUCCH is Physical Uplink Control Channel and PUSCH is Physical Uplink Shared Channel.

Some of the current aperiodic PUSCH-based feedback modes require the UE to report CQI separately for each sub band of N Physical Resource Blocks (PRB) where N depends on bandwidth. Hence in case of sub band CQI reporting, the overhead increase due to adding 256 QAM entries in the CQI table would be multiplied by the number of sub bands. Furthermore in case of MIMO transmission the UE may need to report CQI separately for two code words which would mean that that overhead might increase even further. Finally, LTE supports also carrier aggregation in which case one aperiodic report may contain CQI for multiple carriers. Obviously in such case the overhead increase will be quite significant.

On the other hand, periodic PUCCH reports have typically been able to carry only 11 bits of payload. When supporting MIMO transmissions precoding matrix indicator (PMI) as well as Ms for possibly two code words need to be included within the 11 bits. Currently the reports use all 11 bits in case of two code words, namely 4 bits for the PMI, 4 bits for the first code word CQI and 3 bits for the second code word CQI. It is obvious that the CQI overhead cannot be increased further.

The current LTE CQI mapping table is shown in Table 1. In the mapping table, different index values correspond to different coding and modulation combinations and the modulation methods used include Quadrature Phase Shift. Keying (QPSK), 16 Quadrature Amplitude Modulation (16 QAM), and 64 QAM.

The UE is configured to determine SINR in a given radio channel and select a suitable CQI from the table and report it to the eNodeB, It is known that the SINR measurement accuracy varies depending on the channel conditions. At low SINR situations the measurement accuracy is lower compared to high SINR conditions. However, the mapping table has been designed such that the differences between the SINR levels required for consecutive COT indices are roughly 2 dB. At low SINR range, this seems even too accurate quantization considering the estimation accuracy.

TABLE 1

| CQI index | modulation | code rate × 1024 | efficiency |
|-----------|------------|------------------|------------|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 3A:
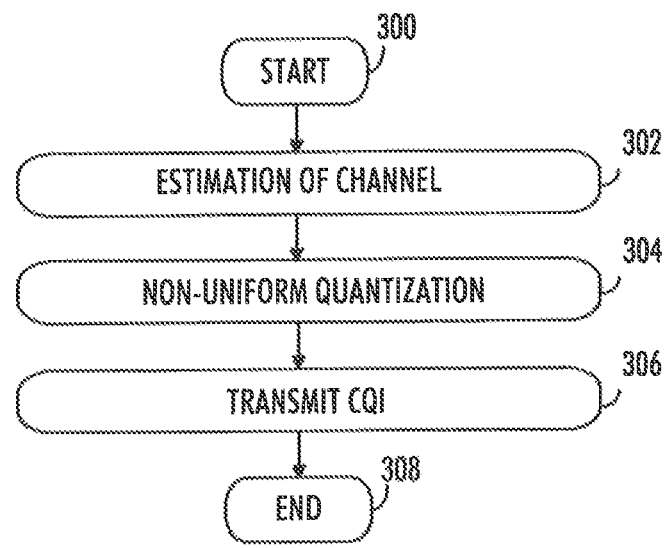
FIGS. 3A and 3B are flowcharts illustrating embodiments of the invention.

FIG. 3A is a flowchart illustrating an embodiment of the invention. The process starts at step 300. In this example it is assumed that the modulation methods used in the system include 256 QAM or some other high level method.

In step 302, user equipment is configured to estimate a radio channel to obtain an estimate of the channel quality level.

In step 304, user equipment is configured to perform quantization of the estimate of the channel quality to obtain a channel quality index. The quantization steps are of non-uniform size and they have been selected on the basis of the accuracy of the estimation on different levels of channel quality.

At low SINR (hence low CQI values), the difference between the required SINR levels corresponding two consecutive CQI indices may be larger than at high SINR (hence high CQI values). This is because at low SINR the estimation accuracy will be low. Thus, some of the existing states in the 4-bit CQI report of Table 1 may be used for new 256 QAM states, where the existing states are chosen such as to make the effective quantization of the CQI non-uniform. For example, some of the states corresponding to low CQI values may be utilized.

In step 306, user equipment is configured transmit the channel quality index to the communication system.

The process ends in step 308.

Figure 4:
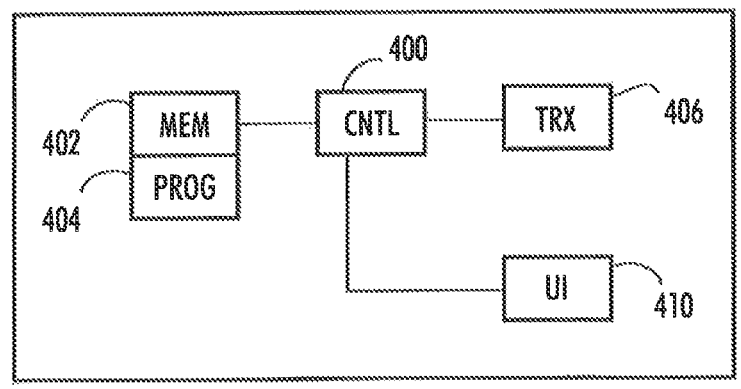
FIGS. 4 and 5 illustrate examples of apparatuses applying embodiments of the invention.

FIG. 4 illustrates an embodiment. The figure illustrates a simplified example of a device in which embodiments of the invention may be applied. In some embodiments, the device may be user equipment UE or a respective device communicating with a base station or an eNodeB of a communications system.

It should be understood that the apparatus is depicted herein as an example illustrating some embodiments. It is apparent to a person skilled in the art that the device may also include other functions and/or structures and not all described functions and structures are required. Although the device has been depicted as one entity, different modules and memory may be implemented in one or more physical or logical entities.

The device of the example includes a control circuitry or a processing circuit 400 configured to control at least part of the operation of the device.

The device may include a memory 402 for storing data. Furthermore the memory may store software 404 executable by the control circuitry 400. The memory may be integrated in the control circuitry.

The device includes a transceiver 406. The transceiver is operationally connected to the control circuitry 400. It may be connected to an antenna arrangement (not shown).

The software 404 may include a computer program including program code means adapted to cause the control circuitry 400 of the device to control a transceiver 406.

The device may further include user interface 410 operationally connected to the control circuitry 400. The user interface may include a display which may be touch sensitive, a keyboard or keypad, a microphone and a speaker, for example.

The control circuitry 400 may be configured to control the estimation of a radio channel to obtain an estimate of the channel quality level and perform quantization of the estimate of the channel quality to obtain a channel quality index. Furthermore, the control circuitry 400 may be configured to control the transmission of the channel quality index to the communication system.

Figure 3B:
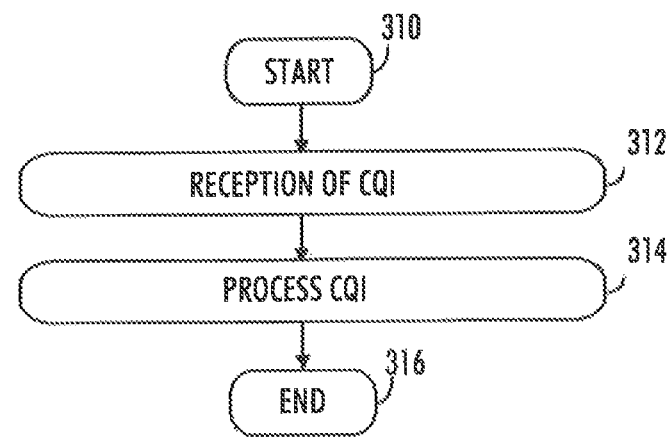

FIG. 3B is a flowchart illustrating an embodiment of the invention. The process starts at step 310. In this example it is assumed that the modulation methods used in the system include 256 QAM or some other high level method.

In step 312, eNodeB is configured to receive a channel quality index transmitted by a transceiver of the communication system, the index describing quality level of a radio channel. The transceiver may be UE of the system connected to the eNodeB.

In step 314, eNodeB is configured to store a channel quality index table where different indices correspond to different channel quality values and where the quantization steps dividing quality values to different indices are of non-uniform size and selected on the basis of the accuracy of the estimation on different levels of channel quality. From the CQI received from the UE the eNodeB obtains information on the MSC which may be used on the radio channels with good enough quality.

The process ends in step 316.

Figure 5:
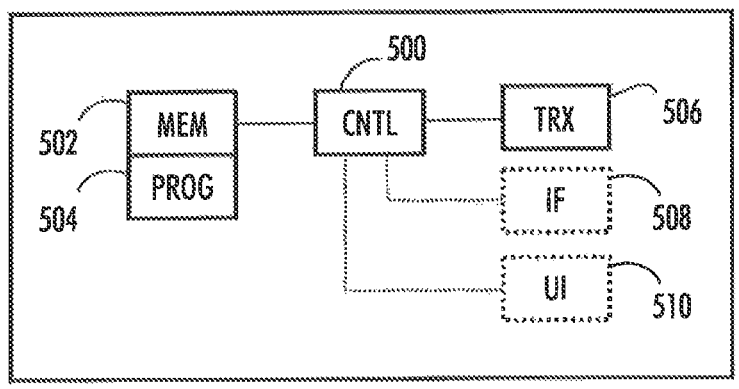

FIG. 5 illustrates an embodiment. The figure illustrates a simplified example of a device in which embodiments of the invention may be applied. In some embodiments, the device may be an eNodeB or a base station or a respective device communicating with mobile units of a communications system.

It should be understood that the device is depicted herein as an example illustrating some embodiments. It is apparent to a person skilled in the art that the device may also include other functions and/or structures and not all described functions and structures are required. Although the device has been depicted as one entity, different modules and memory may be implemented in one or more physical or logical entities.

The device of the example includes a control circuitry or a processing circuit 500 configured to control at least part of the operation of the device.

The device may include a memory 502 for storing data. Furthermore the memory may store software 504 executable by the control circuitry or the processing circuit 500. The memory may be integrated in the control circuitry.

The device includes a transceiver 506. The transceiver is operationally connected to the control circuitry 500. It may be connected to an antenna arrangement (not shown).

The software 504 may include a computer program including program code means adapted to cause the control circuitry 500 of the device to control a transceiver 506 to communicate with and control user equipment.

The device may further include interface circuitry 508 configured to connect the device to other devices and network elements of a communication system, for example to core. This applies especially if the device is an eNodeB or a base station or respective network element. The interface may provide a wired or wireless connection to the communication network. The device may be in connection with core network elements, eNodeB's, Home NodeB's and with other respective devices of communication systems.

The device may further include user interface 510 operationally connected to the control circuitry 500. The user interface may include a display, a keyboard or keypad, a microphone and a speaker, for example.

In an embodiment, the control circuitry 500 is configured to control the device to control the reception of a channel quality index transmitted by a transceiver of the communication system, the index describing radio channel quality level; and control the storing a channel quality index table into the memory 502.

Figure 6A:
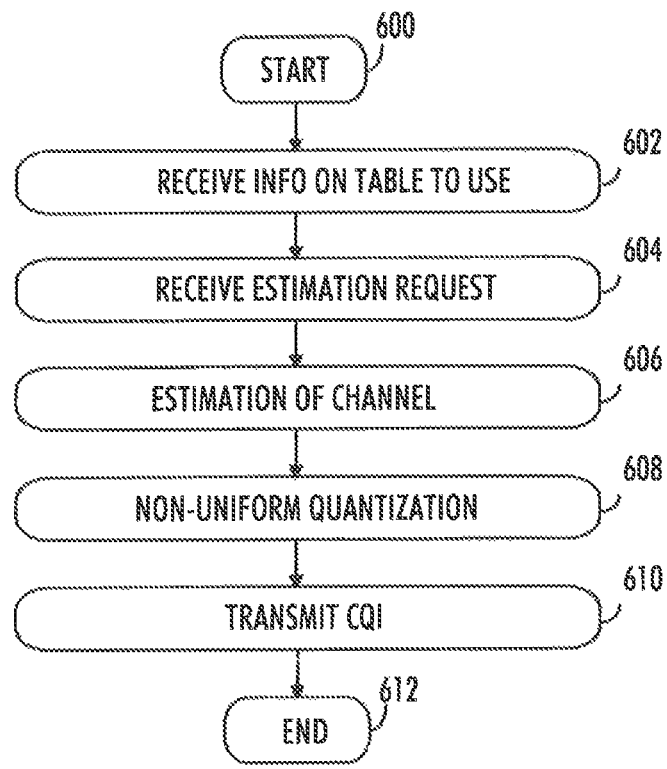
FIGS. 6A and 6B are flowcharts illustrating embodiments of the invention.

FIG. 6A is another flowchart illustrating an embodiment of the invention in user equipment apparatus. The embodiment starts at step 600.

In step 602, an apparatus is configured to receive from an eNodeB information on which CQI table to use. The apparatus may be configured to store more than one CQI tables depending on the communication system. The received information tells the apparatus which non-uniform quantization steps are to be used when quantizing channel estimation results. The quantization steps may be of non-uniform size and that may have been selected on the basis of the accuracy of the estimation on different levels of channel quality. In an embodiment, larger quantization steps are utilized for low channel quality level values than for high channel quality level values. In an embodiment, quantization steps of 3 to 5 dB are utilized for low channel quality level values and quantization steps of 1 to 2 dB for high channel quality level values.

In the CQI table, different index values correspond to different coding and modulation combinations and where the used modulation methods may include QPSK, 16 QAM, 64 QAM and 1.28 QAM or 256 QAM, for example.

In step 604, the apparatus is configured to receive from the eNodeB a request to perform estimation on one or more radio channels. The steps 602 and 604 may be received simultaneously in a single signaling message.

In an embodiment, this can be realized by receiving from the eNodeB a reference signal configuration and a feedback mode, information on which reference signals should be used for channel estimation (and hence CQI feedback) and the type of CSI feedback (frequency-selective/wideband feedback, periodic/aperiodic, for example).

In step 606, user equipment is configured to estimate a radio channel to obtain an estimate of the channel quality level. The estimation may be periodic or aperiodic. Also interference level may be estimated to obtain knowledge on channel quality.

In step 608, the apparatus is configured to perform quantization of the estimate of the channel quality to obtain a channel quality index.

In step 610, the apparatus is configured transmit the channel quality index to the communication system.

The process ends in step 612.

Figure 6B:
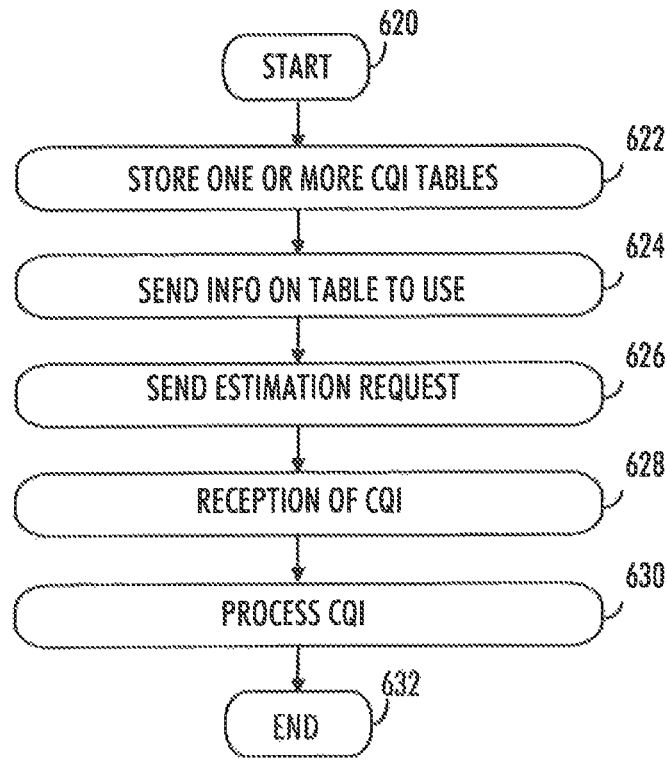

FIG. 6B is another flowchart illustrating an embodiment of the invention in an eNodeB. The embodiment starts at step 620.

In step 622, the eNodeB is configured to store one or more channel quality index tables where different indices correspond to different channel quality values and where the quantization steps dividing quality values to different indices are of non-uniform size and selected on the basis of the accuracy of the estimation on different levels of channel quality. There may be different tables for UEs with different properties. For example, the modulation methods supported by UEs may vary.

In step 624, the eNodeB is configured to send user equipment information on which CQI table to use. In an embodiment, the eNodeB is configured to select the CQI table to use based on the capability of the UE. The UE may have signaled the eNodeB the properties of the UE. In an embodiment, the selection between tables is based on Radio Resource Management RRM measurement reports from the UE indicating favorable radio conditions such that a given modulation method (such as 256 QAM) might be beneficial.

In step 626, the eNodeB is configured to send user equipment estimation request to perform estimation on one or more radio channels. In an embodiment, the steps 624 and 626 are combined simultaneously in a single signaling message. In an embodiment, the eNodeB indicates the UE to report the estimation results in either periodic or aperiodic way.

In an embodiment, the eNodeB sends the UE information on which reference signals to use for the estimation and which feedback mode to use.

In step 628, eNodeB is configured to receive a channel quality index transmitted by a transceiver of the communication system, the index describing quality level of a radio channel. The transceiver may be UE of the system connected to the eNodeB.

In step 630, eNodeB is process the received information. The information may be store for future purposes. In an embodiment, the information regarding the radio channel is used when selecting a suitable modulation and coding scheme for the UE.

The process ends in step 632.

As mentioned above, Table 1 shows the current LTE CQI mapping table which supports QPSK, 16 QAM, and 640 QAM. The mapping table has been designed such that the differences between the SINR levels required for consecutive CQI indices are roughly 2 dB which may be considered too narrow considering the estimation accuracy especially at low SINR range.

There is a Clear need for introducing other modulation methods to the table. A non-limiting example of a new modulation method is 256 QAM. One skilled in the art is aware that other methods may be introduced as well.

Currently in LTE based systems, four bits are used to transmit CQI values to the eNodeB. In an embodiment, some of the existing states (i.e. indices in Table 1) in the 4-bit CQI report are replaced with new 256 QAM states. The states to be replaced are chosen in such a manner that the effective quantization of the CQI is non-uniform. For example, some of the states corresponding to low CQI values may be utilized.

In an embodiment, the table is modified by using indices 2, 4, 6 and 8 for 256 QAM (with suitably chosen code rates) which would mean effectively that at the low SINR regime the quantization accuracy is 4 dB instead of 2 dB.

Alternatively, the whole table may be redesigned, facilitating introduction of 256 QAM states within the 4 bits such that at low SINR regime the quantization step may be 3-5 dB while decreasing towards the high SINR, e.g. to 1-2 dB accuracy. In the latter case there would be two tables from which the eNodeB could select which table to use.

Table 2 illustrates an example of a modified LTE CQI mapping table which supports QPSK, 16 QAM, 64 QAM and 256 QAM. Here the indices 2, 4, 6 and 8 are used for 256 QAM. The values for code rate and efficiency are not shown as they are system parameters and not relevant regarding the disclosed inventive concept. The efficiency of the 256 QAM indices is greater than with the other indices and thus in the example the indices are not in the increasing efficiency order as is the case with Table 1. However, this is not any problem for the UE or eNodeB point of view as the mapping is common for both devices.

TABLE 2

| CQI index | modulation | code rate × 1024 | efficiency |
|---|---|---|---|
| 0 | out of range | | |
| 1 | QPSK | 78 | 0.1523 |
| 2 | 256QAM | ### | #.#### |
| 3 | QPSK | 193 | 0.3770 |
| 4 | 256QAM | ### | #.#### |
| 5 | QPSK | 449 | 0.8770 |
| 6 | 256QAM | ### | #.#### |
| 7 | 16QAM | 378 | 1.4766 |
| 8 | 256QAM | ### | #.#### |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 3 illustrates another example of a modified LIE CQI mapping table which supports QPSK, 16 QAM, 64 QAM and 256 QAM. Here the indices 2, 4, 6 and 8 of the Table 1 are used for 256 QAM. The indices are in the increasing order of efficiency and thus the indices with 256 QAM are at the bottom of the table and the original indices have been shifted upwards. The values for code rate and efficiency are not shown as they are system parameters and not relevant regarding the disclosed inventive concept.

TABLE 3

| CQI index | modulation | code rate × 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 616 | 2.4063 |
| 6 | 64QAM | 466 | 2.7305 |
| 7 | 64QAM | 567 | 3.3223 |
| 8 | 64QAM | 666 | 3.9023 |
| 9 | 64QAM | 772 | 4.5234 |
| 10 | 64QAM | 873 | 5.1152 |
| 11 | 64QAM | 948 | 5.5547 |
| 12 | 256QAM | ### | #.#### |
| 13 | 256QAM | ### | #.#### |
| 14 | 256QAM | ### | #.#### |
| 15 | 256QAM | ### | #.#### |

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may include a working memory (RAM), a central processing unit (CPU), and a system clock. The CPU may include a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, including program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, the apparatus may also be implemented as an apparatus in a communication system, including: means for controlling the estimation of a radio channel to obtain an estimate of a channel quality; means for performing quantization of the estimate of the channel quality to obtain a channel quality index, the quantization steps being of non-uniform size and selected on the basis of the accuracy of the estimation on different levels of channel quality; means for controlling the transmission of the channel quality index to the communication system.

in an embodiment, the apparatus may also be implemented as an apparatus in a communication system, including: means for controlling the reception of a channel quality index transmitted by a transceiver of the communication system, the index describing radio channel quality; and means for storing a channel quality index table where different indices correspond to different channel quality values and where the quantization steps dividing quality values to different indices are of non-uniform size and selected on the basis of the accuracy of the estimation on different levels of channel quality.

It will be obvious to a person skilled in the art that, as technology advances, the inventive concept can be implemented in various ways. The invention and its embodiments are not limited to the examples described above but may vary within the scope of the claims.

What is claimed is:

1. An apparatus in a first communication system, comprising:
    at least one processor; and
    at least one memory including computer program code, the at least one memory and the computer program code configured to, with the at least one processor, cause the apparatus at least to perform:
    controlling an estimation of a radio channel to obtain an estimate of a channel quality;
    performing quantization of the estimate of the channel quality to obtain a channel quality index, the quantization having quantization steps of non-uniform size and selected on the basis of an accuracy of the estimation on different levels of channel quality;
    controlling a transmission of the channel quality index to the communication system.

2. The apparatus of claim 1, the apparatus being configured to receive from the communication system information on which non-uniform quantization steps to use.

3. The apparatus of claim 1, the apparatus being configured to:
    utilise larger quantization steps for low channel quality values than for high channel quality values.

4. The apparatus of claim 1, the apparatus being configured to:
    utilise quantization steps of 3 to 5 dB for low channel quality values and quantization steps of 1 to 2 dB for high channel quality values.

5. The apparatus of claim 1, the apparatus being configured to utilise a channel quality index table when performing the quantization, where different index values in the channel quality index table correspond to different coding and modulation combinations and where used modulation methods include Quadrature Phase Shift Keying (QPSK), 16 Quadrature Amplitude Modulation (16QAM), 64QAM and 128QAM or 256QAM.

6. The apparatus of claim 5, the apparatus being configured to store more than one channel quality index table and receive from the communication system information on which table to use when performing quantization.

7. The apparatus of claim 1, wherein the apparatus is user equipment of a LTE or LTE-A communication system.

8. An apparatus in a first communication system, comprising:
    at least one processor; and
    at least one memory including computer program code, the at least one memory and the computer program code configured to, with the at least one processor, cause the apparatus at least to perform:
    controlling a reception of a channel quality index transmitted by a transceiver of the communication system, the index describing radio channel quality; and
    storing a channel quality index table where different indices correspond to different channel quality values and where quantization steps dividing quality values to different indices are of non-uniform size and selected on the basis of an accuracy of the estimation on different levels of channel quality.

9. The apparatus of claim 8, the apparatus being configured to:
    utilise larger quantization steps for low channel quality values than for high channel quality values.

10. The apparatus of claim 8, the apparatus being configured to:
    utilise quantization steps of 3 to 5 dB for low channel quality values and quantization steps of 1 to 2 dB for high channel quality values.

11. The apparatus of claim 8, the apparatus being configured to store a channel quality index table where different index values correspond to different coding and modulation combinations and where used modulation methods include Quadrature Phase Shift Keying (QPSK) Amplitude Modulation, 16 Quadrature Amplitude Modulation (16QAM), 64QAM and 128QAM or 256QAM.

12. The apparatus of claim 8, the apparatus being configured to store more than one channel quality index table and transmit to the transceiver of the communication system information on which non-uniform quantization steps to use.

13. The apparatus of claim 8, wherein the apparatus is an eNodeB of a LTE or LTE-A communication system.

14. A method in a communication system, comprising:
    controlling an estimation of a radio channel to obtain an estimate of a channel quality;
    performing quantization of the estimate of the channel quality to obtain a channel quality index, the quantization having quantization steps of non-uniform size and selected on a basis of an accuracy of the estimation on different levels of channel quality;
    controlling a transmission of the channel quality index to a communication system.

15. The method of claim 14, further comprising:
    receiving from the communication system information on which non-uniform quantization steps to use.

16. The method of claim 14, further comprising:
    utilizing larger quantization steps for low channel quality values than for high channel quality values.

17. The method of claim 14, further comprising:
    utilizing a channel quality index table when performing the quantization, where different index values in the channel quality index table correspond to different coding and modulation combinations and where used modulation methods include Quadrature Phase Shift Keying (QPSK) Amplitude Modulation, 16Quadrature Amplitude Modulation (16QAM), 64QAM and 128QAM or 256QAM.

18. A method in a communication system, comprising:
controlling a reception of a channel quality index transmitted by a transceiver of the communication system, the index describing radio channel quality; and
storing a channel quality index table where different indices correspond to different channel quality values and where quantization steps dividing quality values to different indices are of non-uniform size and selected on the basis of an accuracy of an estimation on different levels of channel quality.

19. The method of claim 18, further comprising
utilising larger quantization steps for low channel quality values than for high channel quality values.

20. The method of claim 18, further comprising
storing a channel quality index table where different index values correspond to different coding and modulation combinations and where used modulation methods include Quadrature Phase Shift Keying (QPSK) Amplitude Modulation, 16 Quadrature Amplitude Modulation (16QAM), 64QAM and 128QAM or 256QAM.

21. The method of claim 18, the apparatus being configured to store more than one channel quality index table and transmit to the transceiver of the communication system information on which non-uniform quantization steps to use.

22. A non-transitory computer-readable storage medium comprising a set of computer-readable instructions stored thereon, which, when executed by a processing system, cause the processing system to perform the steps of:
controlling an estimation of a radio channel to obtain an estimate of a channel quality;
performing quantization of the estimate of the channel quality to obtain a channel quality index, the quantization having quantization steps of non-uniform size and selected on the basis of an accuracy of the estimation on different levels of channel quality; and
controlling a transmission of the channel quality index to the communication system.

23. A non-transitory computer-readable storage medium comprising a set of computer-readable instructions stored thereon, which, when executed by a processing system, cause the processing system to perform the steps of:
controlling a reception of a channel quality index transmitted by a transceiver of the communication system, the index describing radio channel quality; and
storing a channel quality index table where different indices correspond to different channel quality values and where quantization steps dividing quality values to different indices are of non-uniform size and selected on the basis of an accuracy of an estimation on different levels of channel quality.

* * * * *